Patented Jan. 20, 1931

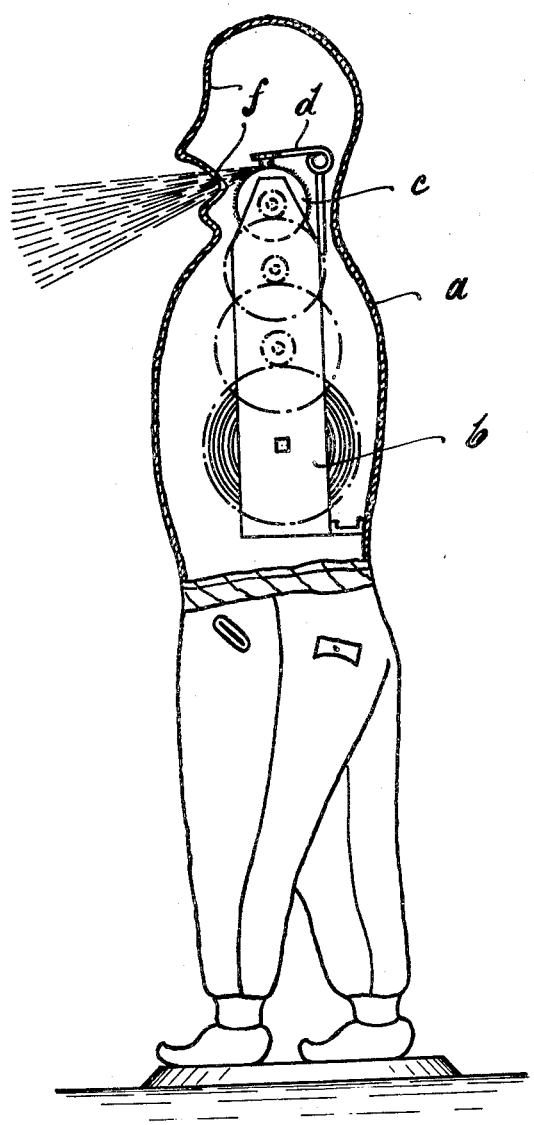

1,789,800

UNITED STATES PATENT OFFICE

CARL ARNOLD, OF NUREMBERG, GERMANY

TOY FIGURE

Application filed July 10, 1928, Serial No. 291,523, and in Germany May 14, 1928.

This invention relates to toy-figures, and it is distinguished in that the figure, for example a fire spitting figure, has apertures behind which the quantities of sparks produced by a spark producing mechanism appear and become visible.

A toy-figure, according to the invention is shown, by way of example, in section partly in elevation in the only figure of the accompanying drawing.

In the casing $a$, which is shown by way of example as a fire-spitter, the driving mechanism $b$ and the friction-wheel $c$, cooperating with said driving mechanism for producing sparks, and the oscillatably mounted cerium-block $d$ are arranged. The casing $a$ has apertures $f$, through which the sparks produced by the spark producing device are ejected.

Owing to this arrangement the figure on the casing looks as if it were spitting fire.

The figure may have any desired shape and may be ornamented at will so that, instead of the imitation of a face, figures of animals, for example a dragon, might be used.

I claim:—

A toy-figure, comprising in combination with a casing imitating a face and having an open aperture, a spark producing device in said casing arranged so that the sparks are ejected through said aperture and the figure looks as if it were spitting fire.

In testimony whereof I affix my signature.

CARL ARNOLD.